United States Patent Office 3,145,313
Patented Aug. 18, 1964

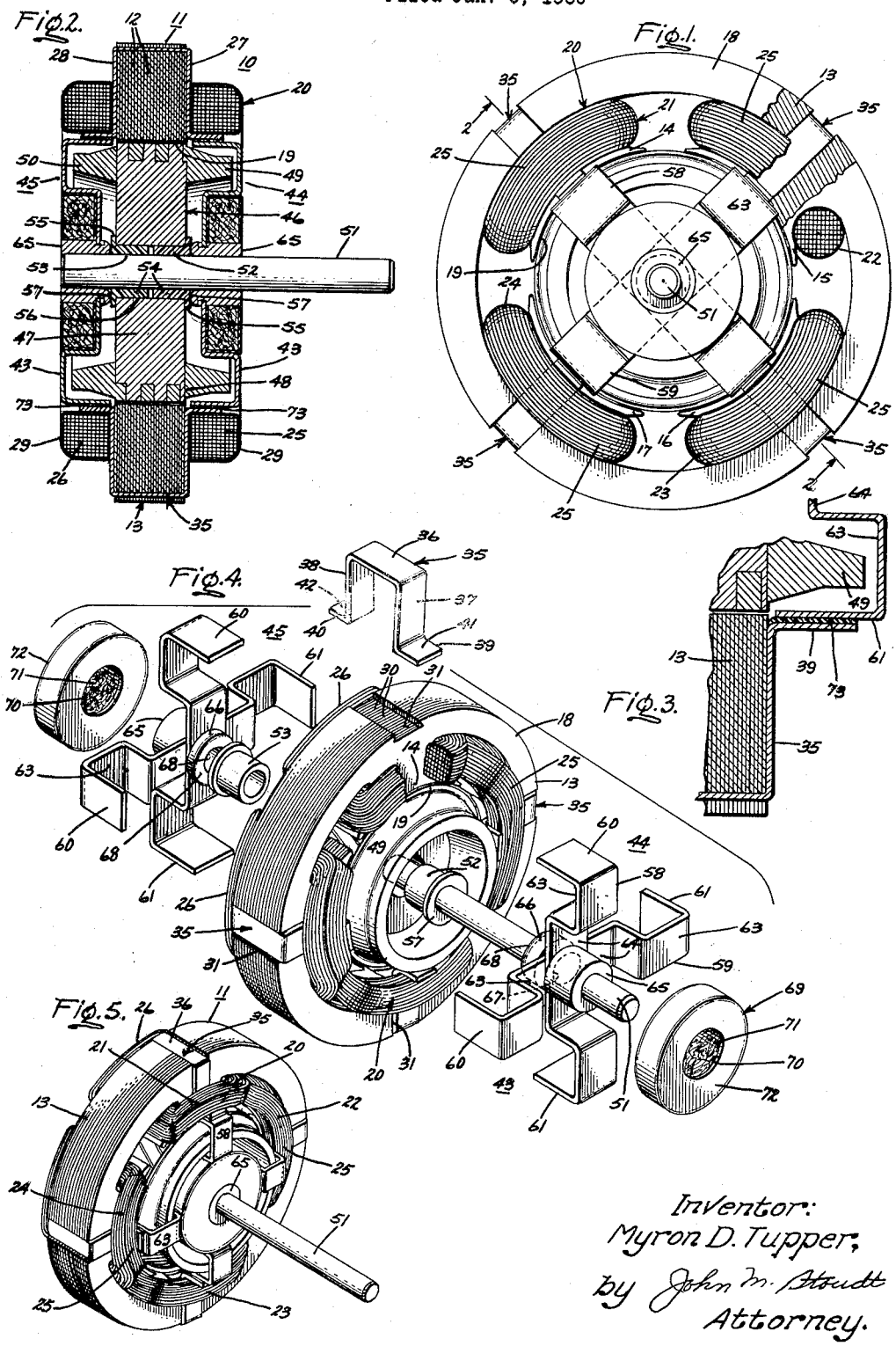

3,145,313
FRACTIONAL HORSEPOWER ELECTRIC MOTOR
Myron D. Tupper, Fort Wayne, Ind., assignor to General
Electric Company, a corporation of New York
Filed Jan. 6, 1960, Ser. No. 744
9 Claims. (Cl. 310—42)

This invention relates generally to dynamoelectric machines, and more particularly, to small and fractional horsepower electric motors.

As is well known to those familiar with the electric motor and generator field, most electrical equipment utilizes a plurality of sheet-like punchings or stacked laminations insulated one from the other and secured together to form magnetic cores commonly referred to as stators. Each stator is provided with a rotor receiving bore and excitation windings having end turns located axially beyond the sides of the stator. A rotatable member, called a rotor, is concentrically arranged within the stator bore, being separated therefrom by an annular air gap which directly affects the efficiency and performance of the motor. The rotor is usually secured to a shaft which, in turn, is rotatably supported by suitable bearings arranged at either end of the stator and fastened to the motor housing.

Thus, it will be appreciated from the foregoing that this construction introduces certain considerations and problems in the manufacture and satisfactory operation of motors, adding to the complexity, size, and over-all cost of the resultant motors. For instance, it is highly desirable and important that the stacked laminations be firmly held together, yet not secured with such force that the insulation becomes broken or that relatively free eddy current paths become established between adjacent laminations. In addition, the winding end turns must be maintained away from the bore so that they will not interfere with the relative rotation between the rotor and stator during motor operation. Further, it is necessary for satisfactory motor performance that the rotor, stator, and bearings be properly aligned and assembled in a predetermined relation, for an off-center rotor will cause unduly high vibrations, excessive noise, and a marked decrease in motor efficiency during motor operation. The degree of interference experienced by the revolving shaft with the shaft carrying bearings, determined to a great extent by the alignment and journal friction of the shaft with the bearings, also adversely affects motor performance and may cause premature bearing failures.

Since motors having the aforementioned structure are employed in a wide variety of applications, other factors are introduced which add to the over-all problem of producing motors. For example, the motors may be utilized in situations where available space for the motor is at a premium and weight is an important consideration; e.g., aircraft and missile applications. In addition, the motors are often placed in inaccessible locations and are required to operate for long periods of time without supervision. Thus, the motors must be of minimum size and weight, yet should incorporate therein adequate lubricating means readily accessible from outside the motor without the need for disassembly and reassembly of the motor to replace or refill the lubricant supply.

It is therefore readily apparent from the foregoing that the provision of an inexpensive, yet satisfactory electrical device having the desired degree of quality and capable of being manufactured in mass production quantities at a minimum of expense, weight, and size is a continuing problem in the motor and general industry.

Accordingly, it is a primary object of the present invention to provide an improved dynamoelectric machine construction involving a minimum of parts, size, and manufacturing costs.

It is another object of this invention to provide an improved stator core construction in which the lamination securing means not only rigidly holds together the stator laminations, but also retains the winding coil end turns away from the rotor receiving bore, as well as provides the means for attaching the rotor supporting elements to the stator in a predetermined position.

Another object is the provision of an improved low-cost dynamoelectric machine which is of novel construction permitting simplification of method of manufacture, and which includes excellent accuracy of bearing alignment and of rotor and stator concentricity.

Yet another object of the present invention is the provision of an improved low-cost rotor supporting structure incorporating means for proper bearing lubrication.

In carrying out the objects of this invention in one form thereof, I provide an improved low-cost dynamoelectric machine having a stator core comprised of a plurality of laminations in juxtaposed relation to form a stack and an excitation winding thereon. A plurality of grooves extend axially across the outer periphery of the stack at spaced apart locations and an elongated strip member is disposed in each groove. The strip member is formed with leg portions projecting axially beyond the ends of the groove and are bent over into axially compressing engagement with each end face of the stack to secure the laminations together. The free ends of the leg portions extend axially away from the stack end faces, below the end turns of the winding in engagement therewith for holding the end turns away from the rotor receiving bore. Rotor supporting means are attached to the free ends of the strips in a predetermined fashion for providing a rotatable support of a rotor within a rotor receiving bore formed in the stator stack to define an accurate air gap therewith.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is an end view, broken away in part, of an electric motor embodying my invention;

FIG. 2 is an axial view, partially in section, taken on line 2—2 of FIG. 1;

FIG. 3 is a view in section of a portion of the stator core without the excitation windings positioned thereon and of a portion of the rotor supporting means of the present invention;

FIG. 4 is an exploded pictorial view of the motor shown in FIG. 1 to illustrate detail; and FIG. 5 is a perspective view of the motor illustrated in FIG. 1.

Referring now to the drawing in more detail, the various figures show the preferred embodiment of my invention applied to a motor 10 of the fractional horsepower alternating current induction type. The illustrated motor is provided with a stator core 11 comprised of a plurality of identical sheet-like laminations 12 which are superimposed in face to face relation to form an aligned stack 13 of the salient pole type. More specifically, the stack has four salient poles 14, 15, 16 and 17 disposed inwardly of a yoke section 18, the inner peripheral edges of the poles forming a rotor receiving bore 19 in the usual way.

A field excitation winding 20, wound with a plurality of turns of suitable enameled magnet wire to form coils 21, 22, 23 and 24 respectively, has one coil distributed around the neck of each pole. Each coil, in turn, has end turns 25 and 26 extending axially beyond the respective side faces 27 and 28 of the laminated stack. Winding 20 may be electrically insulated from stack 13 by any suitable means 29, such as by a thin coating of an organic polymeric thermoplastic resin (e.g., polyethylene) known as integral insulation, applied to the outer surface of the individual coils to completely encapsulate them in the customary manner. The apparatus described thus far is by way of illustration and it will be apparent to those familiar with the motor art that this invention is applicable to other types of construction.

Referring now to FIGS. 2, 4, and 5 in particular, there is illustrated the preferred embodiment of my novel means for fastening the individual laminations 12 rigidly together as well as for holding the end turns away from the rotor bore and for rotatably supporting the rotor relative to the stator core. At their outer peripheries, laminations 12 are punched out with slots 30, preferably near the peripheral center of each pole where the area has a minimum flux density so as to cause the least interference with the electrical characteristics of the motor. Since the illustrated motor is of the four pole type, it will be observed that with the individual laminations assembled in a stacked relation, the slots will be axially aligned to produce four substantially identical shallow grooves 31 which extend axially across the outer periphery of the stack at circumferentially spaced apart positions. This results in the construction wherein each groove has a diametrically opposite groove. In the illustrated embodiment, each groove has a substantially flat bottom wall 32 and side walls 33 and 34 converging outwardly to form a dovetailed configuration.

For securing the laminations together, an elongated strip member 35 is provided in each of the grooves 31. In the preferred form, member 35 may be stamped from a substantially rectangular elongated strip of stiff material, such as steel to provide a member having a longitudinal dimension greater than the axial length of the groove by a predetermined amount (to be discussed more fully hereinafter) and preferably having a transverse cross section slightly larger than the groove width.

Strip members 35 may be conveniently installed into the accommodating grooves 31 in the following manner. Before winding 20 has been assembled therein, the individual laminations are temporarily held together by some auxiliary means, such as clamps or the like. Initially, each member 35 is compressed into an arched shape in transverse cross section (not shown) having an overall width slightly less than the width of the groove mouth so as to facilitate the assembly of the strip member into the groove. Member 35 is then inserted into the groove with each end projecting beyond the respective stack side faces 27 and 28 and external pressure is applied against the portion of the member located in the groove, identified by the numeral 36 in FIG. 2, to substantially flatten portion 36 and cause the edges thereof to move laterally against the side walls 32 and 33 of the groove. This results in a holding engagement between the strip member and each lamination.

The parts of the strip member 35, which project axially beyond the ends of the stator core, are then bent down at right angles to portion 36, alongside and in axial compressive relation with the stack end faces 27 and 28, to form leg portions 37 and 38. In addition, the free ends of member 35 are bent axially away from the stack end faces at a position radially outside the rotor bore 19, but beneath the neck of the poles so that member 35 is provided with flanged ends 39 and 40 for purposes which will become more apparent as the description proceeds.

It will be apparent to those skilled in the art that winding 20 may be wound on stack 13 and the insulation 29 applied to the winding by any well known means, such as by a fluidized bed process, at any time subsequent to the assembly of all the strip members 35 onto stack 13. With the winding in place on the stack, as seen more clearly in FIG. 2, the coil end turns 25 and 26 will rest on the respective adjacent upper surfaces 41 and 42 of strip flanged ends 39 and 40, being electrically insulated therefrom by insulation 29.

These same flanged ends also provide the means for securing the rotor supporting means, generally indicated at 43, in a rigid and permanent relation to stator core 11. Rotor supporting means 43, in its preferred form, comprises two identical rotor supporting assemblies 44 and 45, rotatably carrying a rotor 46 therebetween. As illustrated in FIG. 2, rotor 46 includes the standard squirrel cage winding construction in which a cylindrical body 47 of magnetic material has a plurality of equispaced conductors 48 with an end ring 49 and 50 disposed at the respective ends of rotor body 47, which electrically join all the conductors together in the usual way.

In the preferred embodiment, rotor 46 is secured to a rotor shaft 51 for rotation therewith by a pair of substantially similar spacers 52 and 53, being formed from suitable non-magnetic material, such as nylon. Each spacer is provided in the form of a longitudinally extending sleeve 54 having a collar 55 at one end thereof. It will be observed from FIG. 2, that spacers 52 and 53 are arranged on shaft 51 with each sleeve 54 projecting into a central rotor bore 56. Rotor 46 is connected to these sleeves, which in turn are fastened to shaft 51, by an interference or pressure fit between the engaging surfaces of the respective abutting relation with an end face of rotor 46, adjacent bore 56, to limit axial movement of the spacer sleeves within bore 56. The outer radial surface 57 of the collar acts as a thrust surface for transmitting an axial thrust load and for limiting axial movement of the rotor and shaft in a manner hereinafter described.

Referring now specifically to rotor supporting assemblies 44 and 45, as better shown in FIG. 4, each assembly preferably comprises a pair of similar brackets 58 and 59, stamped from stiff strip material, such as steel. For purposes of explanation, assembly 44 will be described in detail, but it is understood that assembly 45 may be constructed in a like manner. Each of the brackets 58 and 59 has a pair of spaced apart, axially extending outer end sections 60 and 61, integrally joined by a bight or connecting section 62. This connecting section is so bent that its outer portion 63, along with the adjacent outer end section, forms between them a generally U-shaped compartment which fits around the rotor end ring 49 in spaced relation thereto (see FIG. 3). The central part of each connecting section 62 has a substantially radially wall 64 adapted to fit within rotor end ring 49 and, with outer portion 63, defines in effect a recess opening outwardly of the assembly, away from the motor interior.

A sleeve bearing 65, preferably of the porous sintered type, has one of its ends 66 securely fastened to brackets 58 and 59, such as by initially forming end 66 with an outer diameter of reduced size, projecting it through aligned openings 67 provided centrally in wall 64 of the respective bracket members, and peening over or staking the bearing end against bracket 58. With this arrangement, the greater part of the bearing will thus be surrounded by the recess mentioned heretofore, and the end face 68 of bearing end 66 forms a stationary thrust surface for cooperation with the adjacent rotatable thrust surface 57 of spacer 52.

For bearing and shaft lubricating purposes, by way of illustration only, a lubrication reservoir of the type disclosed and claimed in the copending application of Karl M. Feiertag and Myron D. Tupper, Serial No. 751,254, filed July 28, 1958 (assigned to the same assignee of the present invention), may be provided on rotor supporting assembly 44 in the following manner. Briefly described (see FIG. 4 in particular), the reservoir supply includes a unitary self-supporting annular lubricant reservoir, generally indicated at 69, having a transverse opening 70 formed centrally therethrough. The reservoir is formed with a lubricant absorbent body 71, such as felt, which holds a supply of lubricant. All the surfaces of body 71, with the exception of opening 70, have an integral protective covering 72 of lubricant impervious and resistant pliable material; e.g. synthetic rubber.

In its assembled position on rotor supporting assembly 44, as seen in FIGS. 2 and 5, reservoir 69 is accommodated by the recess of the connecting section 62 of the respective brackets 58 and 59 and maintained therein, as by an interference fit between the outer peripheral surface of the reservoir 69 and the adjacent portion 63 of connecting section 62. Absorbent body 71 snugly fits over the outer surface of bearing 66 and is capable of feeding lubricant by capillary action to the bearing journalling surface as needed. This construction permits the removal of the reservoir from the rotor supporting assembly 44 for refill or replacement purposes without the necessity of disassemblying the rotor supporting assembly whatsoever. Further, the particular bracket configuration of the rotor supporting assembly permits the use of this desirable type of reservoir radially within the end rings, eliminating any need for axially lengthing the motor to incorporate a lubricant system as was previously required in many instances.

Rotor supporting assembly 44 described above may be rigidly mounted relative to stator core 11 in the manner illustrated in FIGS. 2 and 3. The outer sections 60 and 61 of the respective rotor supporting brackets 58 and 59 are preferably disposed in spaced relation to the under surface of adjacent flanged ends 39 of strip members 35. A structural adhesive bonding material 73, preferably comprised of a hardenable material which is substantially non-shrinking between an uncured and cured state; e.g. curable organic thermosetting type of resin, fills the space between the outer sections and the adjacent flanged ends 39, thereby rigidly and permanently securing rotor supporting assembly 44 to the strip members 35 in a predetermined position. In the illustrated embodiment, this securement is provided at four equally spaced apart positions since the motor shown is of the four pole variety utilizing four strip members 35.

Rotor supporting assembly 44 may be easily and conveniently assembled merely by initially forming brackets 58 and 59 into configuration previously discussed, such as by a simple stamping and bending operation well known in the art. Thereafter, the brackets are temporarily held together at approximately right angles to each other and bearing 65 secured thereto by peening over bearing end 66, thus holding the brackets in a relatively fixed position. At this point, or any time thereafter, lubricant reservoir 69 may be mounted into the recess of the brackets 58 and 59.

The rotor and shaft assembly and its supporting assemblies 44 and 45 may be assembled onto the stator core 11 in any suitable way. For example, in one method, the rotor and shaft assembly is arranged within the rotor receiving bore of the stator stack 13 in spaced relation with removable shim means; e.g. gage strips, positioned in the air gap defined between the rotor and stator members to maintain them in an accurate and concentric relation (not shown).

Rotor supporting assemblies 44 and 45 are then positioned on the respective sides of the stator stack 13 with the bearings 66 slipped over the ends of the shaft 51 and with the outer sections 60 and 61 of brackets 58 and 59 disposed adjacent flanged ends 30 and 40 of strip members 35 in loose relation thereto. Bonding material 73 in its uncured state is provided between the adjacent parts and thereafter hardened, by the application of heat, at least to the point where the rotor supporting assemblies 44 and 45 are firmly secured to strip members 35 before the shim means are removed from the air gap. After the shim means have been removed, the bearing and shaft are left freely rotatable and accurately aligned relative to one another and the rotor is concentrically arranged within the rotor receiving bore to define an accurate air gap therewith.

It will also be appreciated that, in view of the axial overlap (see FIGS. 1 and 3 for example) between the flanged ends of strip members 35 and the adjacent outer sections of brackets 58 and 59 which are ultimately secured thereto, the stationary bearing end surface 68 of the respective rotor supporting assemblies may be positioned directly against the spacer thrust surface 57. Thus, shims or other spacer means for properly limiting the axial movement or rotor end play during motor operation, which might otherwise be required, are effectively eliminated.

It will be readily manifest from the foregoing that the advantages of this invention are numerous. Inexpensive stamped out parts may be used without adversely affecting the accurate alignment of the individual motor components. Moreover, by an important aspect of the invention, the same member which secures the stator laminations firmly together, also provides the means for holding the winding end turns away from the rotor bore and for supporting the rotor supporting means, further reducing the over-all cost of the motor. The novel construction also permits the use of a lubricant supply which is readily accessible from outside of the motor without requiring the inconvenience or need of disassembly of the motor for replacement thereof, yet which does not increase the over-all size of the motor. In addition, the novel motor permits the use of a relatively simple and inexpensive assembly procedure.

It should be apparent to those skilled in the art, which I have shown and described what at present is considered to be the preferred embodiment of my invention in accordance with the patent statutes, changes may be made in the structure disclosed without actually dparting from the true spirit and scope of this invention, and I therefore intend to cover in the following claims all such equivalent variations as fall within the invention.

What I claim as new and desire to secure by Letters Patents of the United States is:

1. A dynamoelectric machine comprising a plurality of laminations in juxtaposed relation to form a stack having side faces and a rotor receiving bore, a plurality of coils arranged on said stack with end turns extending beyond each side face thereof, a plurality of grooves extending axially across the outer periphery of said stack, an elongated strip member for each groove having a central portion disposed in said groove, said strip member formed with leg portions projecting beyond each end of said stack and bent over into axially compressing engagement with said end faces for firmly securing together said laminations in a predetermined position, said strip members having free portions thereof projecting axially away from said stack end faces below said coil end turns in engagement therewith for supporting said end turns away from said rotor receiving bore, a rotor positioned in spaced relation within said rotor receiving bore to define an air gap therewith, rotor supporting means having a portion disposed adjacent said strip member free end portion, and means rigidly securing said rotor supporting means to said strip members at said free end portions.

2. A dynamoelectric machine comprising a plurality of laminations in juxtaposed relation to form a stack having side faces and a rotor receiving bore, a plurality of coils arranged on said stack with end turns extending beyond each side face thereof, a plurality of grooves extending axially across the outer periphery of said stack, an elongated strip member disposed in each of said grooves and having the side edges of a portion of said member in frictional engagement with the adjacent sides of said groove, said strip member formed with integral legs projecting axially beyond each end of said stack and bent over into axially compressing engagement with said end faces for firmly securing together said laminations in a predetermined position, said strip members having the free end portions thereof projecting axially away from said lamination end faces below said coil end turns in engagement therewith for supporting said end turns away from said rotor receiving bore, a shaft, a rotor secured to said shaft and concentrically disposed within said bore with an accurate air gap therebetween, a pair of rotor supporting assemblies each including a portion spaced from and adjacent said strip member free end portion and a central bearing mounting means, said bearing mounting means having a shaft-carrying bearing fixedly secured thereto and having a recess surrounding said bearing, a lubricant reservoir removably maintained in said recess and communicating with said bearing for retaining and supplying lubricant to said bearing, and structural adhesive bonding means positioned between said respective adjacent portions rigidly securing said rotor supporting assemblies to said strip members.

3. A dynamoelectric machine comprising a plurality of laminations in juxtaposed relation to form a stack having side faces and a rotor receiving bore, at least two coils arranged on said stack in diametric relation with end turns extending beyond each side face thereof, a groove extending axially across the outer periphery of said stack, substantially centrally of each core, an elongated strip member having a central portion disposed in each of said grooves and having the side edges of a portion of said member in frictional engagement with the adjacent sides of said groove, said strip member formed with integral legs projecting axially beyond each end of said stack and bent over into axially compressing engagement with said end faces for firmly securing together said laminations in a predetermined position, said strip members having the free ends thereof projecting axially away from said stack end faces below said coil end turns in engagement therewith for supporting said end turns away from said rotor receiving bore, a shaft, a rotor secured to said shaft and concentrically disposed within said bore with an accurate air gap therebetween, a pair of rotor supporting assemblies each including at least one bracket having an axially extending outer section and an inwardly extending section, a shaft-carrying bearing having one end projecting through an opening in said inwardly extending bracket section and being secured thereto for support thereby, the bearings of said assemblies being in axial alignment, a portion of each of said outer sections being adjacent a portion of said free ends of said strip members, and structural adhesive bonding means positioned between said respective adjacent portions and rigidly securing said rotor supporting assemblies to said strip members.

4. A dynamoelectric machine comprising a plurality of laminations in juxtaposed relation to form a stack having side faces and a rotor receiving bore, a plurality of coils arranged on said stack with end turns extending beyond each side face, means fixedly connected to said stack for holding together said laminations in a predetermined position, said means having portions disposed below said coil end turns for maintaining said end turns radially away from said bore, a shaft, a rotor secured on said shaft and arranged in said bore, and a rotor supporting assembly secured to said means at least at one end of said stack for rotatably carrying said shaft and rotor.

5. A dynamoelectric machine comprising a plurality of laminations in juxtaposed relation to form a stack having side faces and a rotor receiving bore, a plurality of coils arranged on said stack with end turns extending beyond each side face, means for holding together said laminations in a predetermined position, said means having portions disposed below said coil end turns in engagement therewith to support said end turns radially away from said bore, a shaft, a rotor secured to said shaft and arranged in said bore, and a rotor supporting assembly secured to said means at each end of said stack, each rotor supporting assembly having a recess opening away from said rotor with a bearing projecting therein for rotatably carrying said shaft, and a lubricant reservoir mounted in said recess for lubricating said bearings and shaft.

6. A dynamoelectric machine comprising a stator having side faces and a rotor receiving bore, a plurality of coils arranged on said stator with end turns extending beyond each side face thereof, a plurality of elongated strip members each having a central portion extending axially across the outer periphery of said stator and leg portions projecting beyond each end of said stator and bent over alongside said end faces, said leg portions having the free ends thereof projecting axially away from said stator end faces below said coil end turns in engagement therewith for supporting said end turns away from said rotor receiving bore, a shaft, a rotor secured on said shaft and arranged in said bore, and a rotor supporting assembly disposed adjacent the free ends of said strip members at each end of said stator for rotatably carrying said shaft and rotor, and means rigidly securing said rotor supporting assemblies to said strip members at the free ends thereof.

7. A dynamoelectric machine comprising a stator having side faces and a rotor receiving bore, a plurality of coils arranged on said stator with end turns extending beyond each side face thereof, a plurality of elongated strip members each having a central portion extending axially across the outer periphery of said stator and leg portions projecting beyond each end of said stator and bent over alongside said end faces, said leg portions having the free ends thereof projecting axially away from said stator side faces below said coil end turns, a shaft, a rotor secured on said shaft and arranged in said bore, and a rotor supporting assembly disposed adjacent the free ends of said strip members at each end of said stator for rotatably carrying said shaft and rotor, means rigidly securing said rotor supporting assemblies to said strip members at the free ends thereof, at least one of said rotor supporting assemblies having a recess opening away from said rotor and having a bearing projecting into said recess, and a lubricant reservoir mounted in said recess for lubricating said bearings and shaft.

8. A dynamoelectric machine comprising a stator including a core having a plurality of laminations in juxtaposed relation to form a stack having side faces and a rotor receiving bore, a plurality of angularly spaced apart grooves extending transversely across the outer periphery of said stack, an elongated strip member accommodated in at least some of said grooves and having the edges of a portion thereof arranged in frictional engagement with the walls of the accommodating groove for securing said stack together, said strip members having the free ends thereof projecting axially beyond each side face of the stator core, a shaft, a rotor secured on said shaft and arranged in said bore, and a rotor supporting assembly disposed adjacent the free ends of said strip members at each end of said stator and rotatably carrying said shaft and rotor, the free ends of said strip members supporting the associated rotor supporting assembly, and means rigidly attaching said rotor supporting assemblies and stator together.

9. The dynamoelectric machine of claim 8 in which the means for rigidly attaching each rotor supporting assembly and stator together includes hardened thermoresponsive adhesive material joining the free ends of said strips to the associated rotor supporting assembly.

References Cited in the file of this patent

UNITED STATES PATENTS

| 931,556 | Balcome et al. | Aug. 17, 1909 |
| 1,810,531 | Engelhardt | Aug. 25, 1931 |

FOREIGN PATENTS

| 546,461 | Belgium | Sept. 26, 1956 |
| 1,117,079 | France | Feb. 13, 1956 |